United States Patent [19]

Alm

[11] Patent Number: 4,827,619

[45] Date of Patent: May 9, 1989

[54] METAL SAW DEVICE

[75] Inventor: Sture I. E. Alm, Lidköping, Sweden

[73] Assignee: Sandvik AB, Sandviken, Sweden

[21] Appl. No.: 175,257

[22] Filed: Mar. 30, 1988

[30] Foreign Application Priority Data

Apr. 6, 1987 [SE] Sweden .............................. 8701425

[51] Int. Cl.$^4$ .............................................. B27B 21/00
[52] U.S. Cl. ......................................... 30/507; 30/517
[58] Field of Search ..................... 30/166 R, 510, 511, 30/507, 517

[56] References Cited

U.S. PATENT DOCUMENTS

| 3,447,580 | 6/1969 | Keymer | 30/517 |
| 3,756,298 | 9/1973 | West | 30/507 |
| 4,651,425 | 3/1987 | Livian | 30/507 |

FOREIGN PATENT DOCUMENTS 649617 10/1962 Canada .
2317041 2/1977 France .

Primary Examiner—Douglas D. Watts
Attorney, Agent, or Firm—Burns, Doane, Swecker & Mathis

[57] ABSTRACT

A saw holder includes a handle and a finger-like extension projecting forwardly from a front end of the handle. The handle includes a downwardly open recess for receiving a rear section of a sawblade. A bridge extends transversely across a front end of the recess for supporting the sawblade from beneath. A front portion of the extension includes a downwardly open groove for receiving a front section of the sawblade. A forwardly and downwardly inclined clamping screw is disposed in the handle for applying a downward force to the sawblade along a line of force disposed rearwardly of the point of contact between the sawblade and the bridge so that the force presses the sawblade downwardly against the bridge in a manner swinging the front section of the sawblade upwardly about that contact point and into contact with an upper surface of the groove.

7 Claims, 2 Drawing Sheets

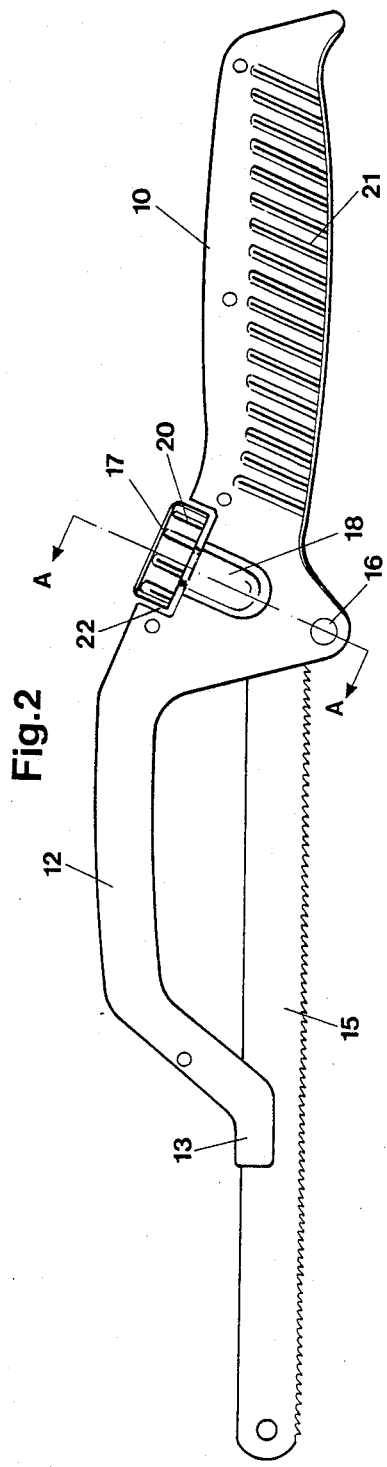
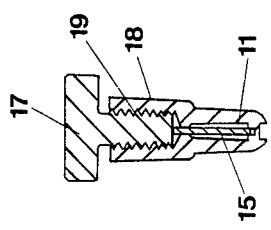
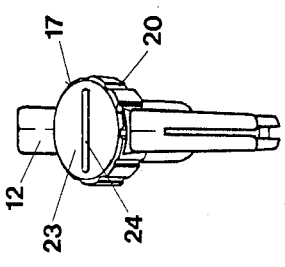
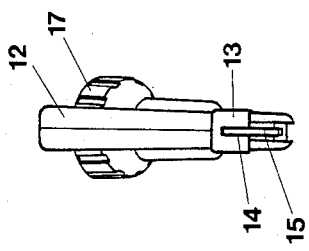

METAL SAW DEVICE

BACKGROUND OF THE INVENTION

It is previously known to use a hacksaw blade as a keyhole saw where there is limited space, as when sawing narrow slits, for cutting nails between wooden members, and for clearing screwdriver slots on screws.

The hacksaw blade is then not held in tension with help of the holes at its ends, but its rear part is inserted in a longitudinal recess or a series of recesses in the gripping part of a handle, which at least partly encloses this part of the blade, and has basically the direction of the blade. The recess has a narrow flat section to prevent rotation of the blade.

In some previous art, the handle has a finger-like forward extension, which can grip the blade near the middle as in West U.S. Pat. No. 3,756,298, with the aim of having at least the part below this extension rigidly supported.

The blade is usually clamped to the handle with a screw, and most previously known designs have screws with horizontal axis, located in the gripping part or in its forward extension. In the former case, the front part of the blade is inadequately guided, even if there is a grooved forward extension, because this does not exert any force on the blade. In the latter case, the screw will through its size make it more difficult to saw in narrow spaces, and there is a great risk of the screw getting loose by striking the sawn object. In the present invention, those and other drawbacks have been eliminated through a new design of the holder, which enables it to hold the blade steadier than previous designs.

THE DRAWING

The invention is described with reference to FIG. 1 showing a perspective view of a metal saw device according to the invention, FIG. 2 showing a lateral view of the device, FIG. 3 showing a front axial view, FIG. 4 showing a rear axial view and FIG. 5 showing a cross-section along the line AA of FIG. 2.

DESCRIPTION OF THE PREFERRED EMBODIMENT OF THE INVENTION

Figure 1:
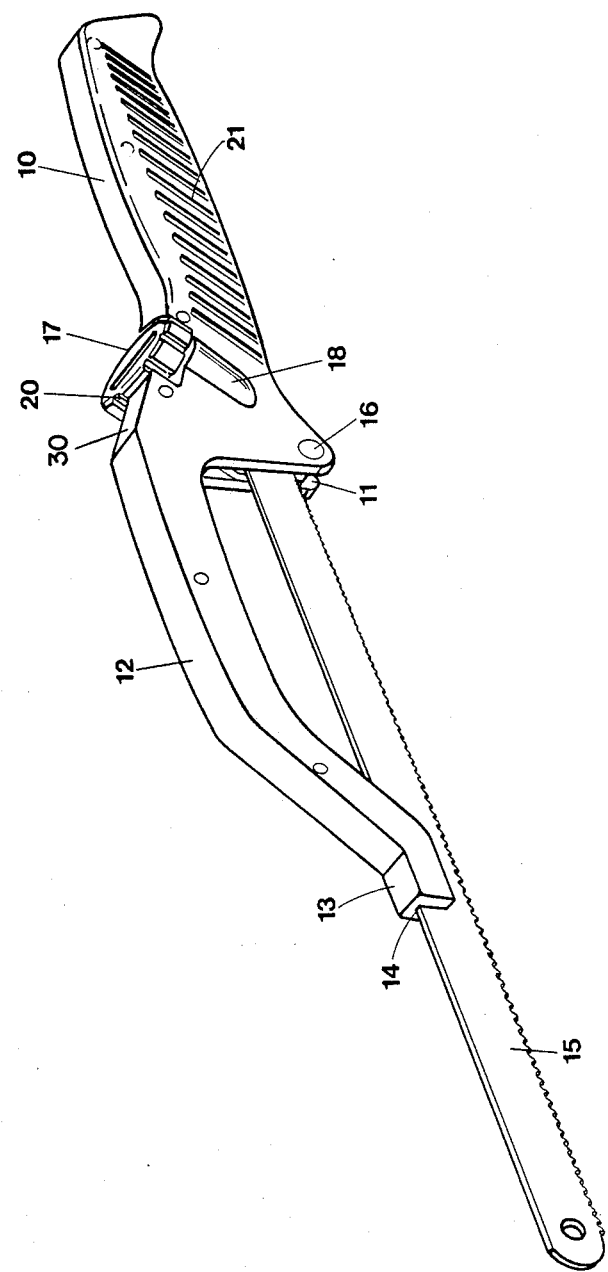

The saw device defined by the invention comprises a handle part 10 with a slightly flattened cross-section, on the underside provided with a recess 11 which to the larger part is open downwards, and a forward extension 12 made integral with the handle part and shaped like a bent finger, free of the saw blade 15 except near the front tip 13 which is provided with a centrally located groove 14, the width of which basically corresponds to the thickness of the sawblade 15. When the rear part of the saw blade is inserted into the recess 11 in the handle part 10 the middle part of the blade is guided by the groove 14. The forward part of the recess is closed by a transversal bridge in the shape of a rivet 16 or other element suitable to transmit reaction forces.

A screw 17, the axis of which lies in the plane of symmetry of the handle 10 is screwed into a threaded hole in the thickened transition portion 18 between the gripping surface of the handle part 10 and the extension 12. The thickening ensures sufficient material for the threads, and prevents the hand slipping forward along the handle if the saw blade is suddenly stopped. When the screw 17 is tightened, it will press directly against the back of the saw blade 15 or indirectly through an intermediary part, which may be shaped as a ball or a cylinder.

Upon tightening of the screw 17, the part of the saw blade 17 situated behind the rivet 16 is pressed downwards, whereby the front part of the saw blade 15 is pressed upwards against the groove 14 in the extension 12 to accomplish a stable fixation without play.

The screw 17 is made with a head adapted for tightening or loosening with the fingers while the handle part 10 is held in the hand, being provided with a knurled or grooved periphery 20. To facilitate stronger tightening or loosening with a screwdriver, the flat top 23 of the screw may be provided with a diametral groove 24.

The axis of the screw 17 is given such an inclination, that the reaction force from the rivet 16 against the teeth of the saw blade 15 has a direction falling within the tooth angle, between the rake face and the clearance face, thereby avoiding fracture of the teeth.

The rivet 16 or other transversal bridge elements across the recess 11 is made from a wear-resistant material, although not so hard that it may damage the teeth of the saw blade 15.

The combined length of the handle part 10 and the extension 12 is preferentially made equal to the length of the saw blade 15, to make the saw device with fully retracted blade take up little space, and to offer full protection for the saw blade 15.

To allow an appropriate hand-hold around the handle part 10, this is made with a non-slip gripping surface such as oblique parallel ribs 21.

The holder includes an upper edge including an inclined section 30. In the preferred embodiment shown by the figures, the head of the screw 17 is sunk into a corresponding recess 22 of the inclined section 30 so that the top surface 23 of the screw head after screwing down fully is level with the inclined section 30.

What is claimed is:

1. A saw holder for supporting a sawblade, comprising:
    a handle having a downwardly open, front-to-rear extending recess for receiving a rear section of the sawblade,
    a bridge extending transversely across a front end of said recess for supporting the sawblade from beneath,
    a finger-like extension projecting forwardly from a front end of said handle, a front portion of said extension including a downwardly open groove for receiving a front section of the sawblade, and
    a blade-clamping screw disposed in said handle and extending downwardly toward said recess, said screw positioned to apply a downward force against the sawblade along a force line situated rearwardly of a point of contact between the sawblade and said bridge such that said force presses the sawblade downwardly against said bridge in a manner swinging the front section of the sawblade upwardly about said contact point and into contact with an upper surface of said groove.

2. A saw holder according to claim 1, wherein said line of force is inclined downwardly and forwardly.

3. A saw holder according to claim 1, wherein said bridge comprises a rivet.

4. A saw holder according to claim 1, wherein said handle includes an upper edge, said clamping screw extending through said upper edge and including an actuating head recessed into said upper edge so that an upper surface of said head lies substantially flush with said upper edge.

5. A saw holder according to claim 4, wherein said top edge includes an inclined section, said clamping screw extending into said inclined section.

6. A saw holder according to claim 2, wherein said handle includes an upper edge, said clamping screw extending through said upper edge and including an actuating head recessed into said upper edge so that an upper surface of said head lies substantially flush with said upper edge.

7. A saw holder according to claim 1 including a ball interposed between a lower end of said clamping screw and the sawblade for transmitting said force to the sawblade.

* * * * *